(12) United States Patent  
Sa

(10) Patent No.: US 12,364,355 B2  
(45) Date of Patent: *Jul. 22, 2025

(54) PORTABLE COFFEE MACHINE

(71) Applicant: UUOOSS LTD, Majuro (MH)

(72) Inventor: Sandy Sa, Majuro (MH)

(73) Assignee: TANZHEXINGJI (Shanghai) Network Technology Co., Ltd, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,049

(22) Filed: Nov. 8, 2023

(65) Prior Publication Data

US 2024/0398146 A1 Dec. 5, 2024

Related U.S. Application Data

(63) Continuation of application No. 18/329,509, filed on Jun. 5, 2023, now Pat. No. 11,903,513.

(51) Int. Cl.
*A47J 31/00* (2006.01)
*A47J 31/057* (2006.01)
*A47J 31/36* (2006.01)

(52) U.S. Cl.
CPC ........... *A47J 31/005* (2013.01); *A47J 31/057* (2013.01); *A47J 31/36* (2013.01)

(58) Field of Classification Search
CPC ........ A47J 31/005; A47J 31/02; A47J 31/057; A47J 31/36

See application file for complete search history.

(56) References Cited

U.S. PATENT DOCUMENTS

| 2006/0107839 | A1* | 5/2006 | Nenov | A47J 31/36 99/275 |
| 2022/0061577 | A1* | 3/2022 | Newman | A47J 31/02 |
| 2022/0125234 | A1* | 4/2022 | Richardson | A47J 31/0576 |

* cited by examiner

*Primary Examiner* — Reginald Alexander
(74) *Attorney, Agent, or Firm* — Ying-Ting Chen

(57) ABSTRACT

A portable coffee machine includes a housing, a drainage module, an extraction module, and a controller, wherein the drainage module includes a water storing cup, a water pump, a conduit, and a drainage assembly, wherein the water storing cup is connected to the housing and is located at a top of the housing, the extraction module is detachably connected to the drainage module, the extraction module includes a transferring cup and an extraction container, the transferring cup is detachably connected to the extraction container, wherein the controller controls the water pump to pump the water in the water storing cup through the conduit and the drainage assembly into the extraction module for making coffee.

3 Claims, 22 Drawing Sheets

PORTABLE COFFEE MACHINE

CROSS REFERENCE OF RELATED APPLICATION

This is a Continuation Applications that claims the benefit of priority under 35U.S.C. § 119 to a non-provisional application, application Ser. No. 18/329,509, filed on Jun. 5, 2023, wherein the entire content of which is expressly incorporated herein by reference.

BACKGROUND OF THE PRESENT INVENTION

Field of Invention

The present invention relates to the field of coffee machine technology, and more particularly to a portable coffee machine.

Description of Related Arts

Coffee is a globally popular beverage, which is frequently consumed in social gatherings and office settings by white-collar workers due to its ability to energize, refresh, and relieve hangovers. The coffee we drink daily is made by using various types of coffee beans with different brewing equipment.

A conventional way of making coffee is mostly pouring hot water into a cup to brew the coffee powder inside. The taste of the coffee brewed this way is not well and cannot meet the strict requirements of taste for coffee lovers. If roasted coffee beans are exposed to the air for a long time, they will undergo chemical changes and gradually become acidic. This causes many large packages of coffee powder or coffee beans to undergo changes that are not yet noticeable when consumed, and they fail to meet people's requirements. Therefore, making it into capsule coffee is a common solution. Capsule coffee is made by grinding the coffee beans into coffee powder first, and then putting them into an aluminum capsule to avoid problems such as oxidation caused by ordinary coffee beans or coffee powder contacting with the air. It effectively preserves the fresh taste of the coffee.

However, this type of capsule requires a professional coffee machine for brewing. A current capsule coffee machine is generally bulky and can only be placed indoors. In the high-paced work and life of society, people cannot spare enough time to use a professional coffee machine for brewing. Also, under outdoor circumstances such as traveling, there are no facilities for brewing, which makes it impossible to enjoy freshly brewed coffee anytime and anywhere.

A current conventional coffee machine generally has a bulky size, which is not convenient for people to carry around. When making coffee outdoors, most people pour hot water into a cup to brew the coffee powder. They need to stir it quickly to dissolve the coffee powder, and the resulting coffee is usually of average taste and cannot meet users' needs.

In other words, the conventional technology involves grinding coffee beans into coffee powder and packing the powder into food-grade packaging bags or capsules to form coffee cakes or coffee capsules. However, the machines for brewing such coffee cakes or coffee capsules into espresso are bulky and not easy to carry, which cannot meet people's demand for drinking coffee when on business trips or traveling, and the coffee capsules are expensive.

There are now some portable coffee machines on the market, but these machines cannot adapt to both coffee capsules and coffee powder at the same time, and because the extraction blade design is relatively simple when extracting coffee capsules, the extraction efficiency is low. In addition, these portable coffee machines do not have a water pump and drainage assembly, resulting in uncontrollable water flow speed and difficult water flow direction changing. These portable coffee machines also do not have a heating module, thus requiring hot water to be added to the coffee machine. Furthermore, these portable coffee machines have poor air tightness and sealing performance, which can easily cause water leakage.

SUMMARY OF THE PRESENT INVENTION

The present invention provides a portable electric pumping coffee machine, which comprises a housing, a drainage module, an extraction module, and a controller, wherein the drainage module comprises a water storing cup, a water pump, a conduit, and a drainage assembly, wherein the water storing cup is connected to the housing and is located at a top of the housing, the extraction module is detachably connected to the drainage module, the extraction module comprises a transferring cup and an extraction container, the transferring cup is detachably connected to the extraction container, wherein the controller comprises a control module for controlling the water pump to pump the water in the water storing cup through the conduit and the drainage assembly into the extraction module.

Preferably, the extraction container is a first extraction container for extracting coffee powder, wherein the first extraction container is provided with a filtering layer and a one-way valve.

Preferably, the first extraction container comprises a cover and a container body. The top of the cover is provided with a third through hole arranged in a ring shape, which can allow water to enter and form a circulation to sufficiently extract the coffee powder.

Preferably, a filtering layer is arranged at the bottom of the container body, and a plurality of upward extending buckles are provided at the edge of the filtering layer, which facilitates the disassembly and cleaning of the filtering layer.

Preferably, a one-way valve is provided at the center of the bottom of the container body to prevent the backflow of coffee liquid due to high pressure after the water pump stops running.

Preferably, the extraction container is a second extraction container wherein the second extraction container is used for extracting a coffee capsule and is equipped with at least one extraction blade.

Preferably, there is a groove at the center of an end of the second extraction container, and a plurality of extraction blades is extended from the edge around the groove.

Preferably, a fourth through hole is located near the extraction blade at the end of the second extraction container, and the side of the extraction blade is bent toward the direction of the fourth through hole, so that the water flowing through the fourth through hole can fully enter the coffee capsule.

Preferably, the drainage module further comprises a limiting frame and a fixing base, wherein the limiting frame is provided with a first through hole away from the center, one end of the drainage assembly is extended into the first through hole, and a protruding block is extended towards the center of the limiting frame at the first through hole. The limiting frame comprises projections for limiting the drainage assembly, wherein the fixing base is connected with the limit frame, the fixing base is provided with a fifth groove, the fifth groove is provided with a second through hole.

Preferably, the portable electric pumping coffee machine further comprises a sensor assembly, a driving module and a power module, the sensor assembly is electrically connected to the power module, and the sensor assembly comprises a first sensor and a second sensor. The first sensor is connected to the water storing cup to detect the temperature of the water in the water storing cup. The second sensor is connected to the battery to detect the temperature of the battery. The driving module is electrically connected to the control module, and the driving module comprises a driving motor, wherein the driving motor is connected to the water pump for driving the water pump. The power module is electrically connected to the control module and the driving module, and comprises a battery for providing power to other modules.

Preferably, the first sensor and the second sensor are temperature sensors.

Preferably, the portable electric pumping coffee machine further comprises a heating module, wherein the heating module comprises a heating member, the heating member is connected to the water storing cup, and the heating member is used for heating the water in the water storing cup.

Preferably, the portable electric pumping coffee machine further comprises a mounting bracket, wherein a bottom of the mounting bracket is provided with the controller and an upper fixing arm, and the upper fixing arm is connected to the water storing cup, the other side of the bottom of the mounting bracket is provided with a lower fixing foot, which is connected to the limiting frame.

Preferably, there is a peripheral hole provided in the water storing cup, and there is a hollow column extended from the peripheral hole. One end of the conduit is connected to the hollow column, and the other end of the conduit is connected to the drainage assembly. One side of the water pump is connected to the drainage assembly.

Preferably, the bottom of the transferring cup is provided with protrusions and small holes, and the inner wall of the transferring cup is provided with engaging blocks.

The above technical solution has the following advantages or beneficial effects.

First of all, the portable electric pumping coffee machine of the present invention is equipped with a drainage assembly, which is connected to a water pump. The drainage assembly is able to change the direction and control the flow rate of the water while pumping the water into the extraction cup. Moreover, the second groove of the drainage assembly is equipped with an inclined groove for the convenience of water flow entering the first water inlet, thus avoiding water overflow.

Secondly, the portable electric pumping coffee machine of the present invention is equipped with one or more extraction blades, the side of which is bent towards the direction of the fourth through hole, so that the water flowing through the fourth through hole can fully enter the coffee capsule through the extraction blades, thereby improving the extraction efficiency.

Thirdly, the portable electric pumping coffee machine of the present invention is equipped with a heating module, which can heat the water in the water storing cup, enhancing the applicability and versatility of the coffee machine.

Fourthly, this portable electric pumping coffee machine of the present invention is equipped with extraction containers which allow for the extraction of coffee capsule and coffee powder, increasing its versatility.

The invention also provides a heating assembly, which is used in a portable coffee machine, the heating assembly comprises a heating cup that is connected to a water pipe. The outer surrounding wall or bottom of the heating cup is equipped with a heating member which is arranged to heat water in the heating cup.

In the above technical solution, preferably, the water pipe is provided on the peripheral edge of the bottom of the heating cup, the heating member is installed at the bottom of the heating cup.

In the above technical solution, preferably, the heating member is provided at the bottom of the heating cup, and the water pipe is provided at the center of the bottom of the heating cup, and passes through the heating member.

In the above technical solution, preferably, the heating member is a heating tube which is wound around the outer surrounding wall and the bottom of the heating cup.

In the above technical solution, preferably, the heating member is covered on the outer surrounding wall and the bottom of the heating cup, and is provided with a hole for the water pipe to pass through.

The present invention also discloses a portable coffee machine comprising a machine main body. The aforementioned heating assembly is used within the machine main body.

Preferably, the machine main body, from top to bottom, comprising an top cover, a housing, and a coffee cup. A upper supporting plate and a lower supporting plate are arranged inside the housing. A water pump is arranged on the lower supporting plate, and the drain sleeve is installed below. The water pump is connected to the heating cup through the water pipe. The drain sleeve is connected to the supporting sleeve, and the diversion sleeve is arranged between the supporting sleeve and the drain sleeve. The coffee capsule is installed in the diversion sleeve, and the coffee cup is covered by the drain sleeve. The water pump pressurizes the water to pass through the drain sleeve and the diversion sleeve, so as to act on a coffee capsule for achieving brewing. Then, the coffee liquid enters the supporting sleeve and finally flows into the coffee cup.

Preferably, there is a battery housed in the space between the lower supporting plate and the upper supporting plate. The upper supporting plate is equipped with a controlling circuit board, which is connected to a vertical sub-board. The sub-board is where a controlling button is positioned and there are one or more indicator lights below the controlling button. Additionally, a charging port is also located on the housing, which is connected to the circuit board installed in the sub-board.

Preferably, the top cover is provided with one or more breathable holes, and a one-way valve is installed at the breathable holes to avoid water leakage from the heating cup.

Preferably, the top surface of the drain sleeve is provided with a collection groove and a collection hole is provided at the center position. The water pump is provided with an outlet, and the outlet is aligned with the collection groove.

Preferably, the diversion sleeve is provided with a diversion groove on the top center, and a diversion hole is located on the outer side of the diversion groove. The capsule compartment is arranged inside the diversion sleeve, and a breaking blade is installed on the top of the capsule compartment. The breaking blade is used to cut the outer wall of the coffee capsule, so that the water flowing down from the diversion hole can be fully mixed with the coffee powder.

Preferably, the bottom of the supporting sleeve is equipped with a guide cone surface, and the convergence of the guide cone surface is provided with a coffee outlet hole. The supporting sleeve is internally equipped with a bottom plate, which is provided with a plurality of protrusions for holding the coffee capsule, and a plurality of bumps are also provided on the bottom plate.

The present invention provides a heating assembly and a portable coffee machine. The structure of the coffee machine is simple and compact, which makes it easy for users to carry around and meet their need to drink coffee anytime and anywhere. Moreover, the coffee machine is capable of automatically producing high-pressure water when brewing coffee, resulting in a rich aroma of coffee.

DETAILED DESCRIPTION OF THE PREFERRED EMBODIMENT

Figure 1:
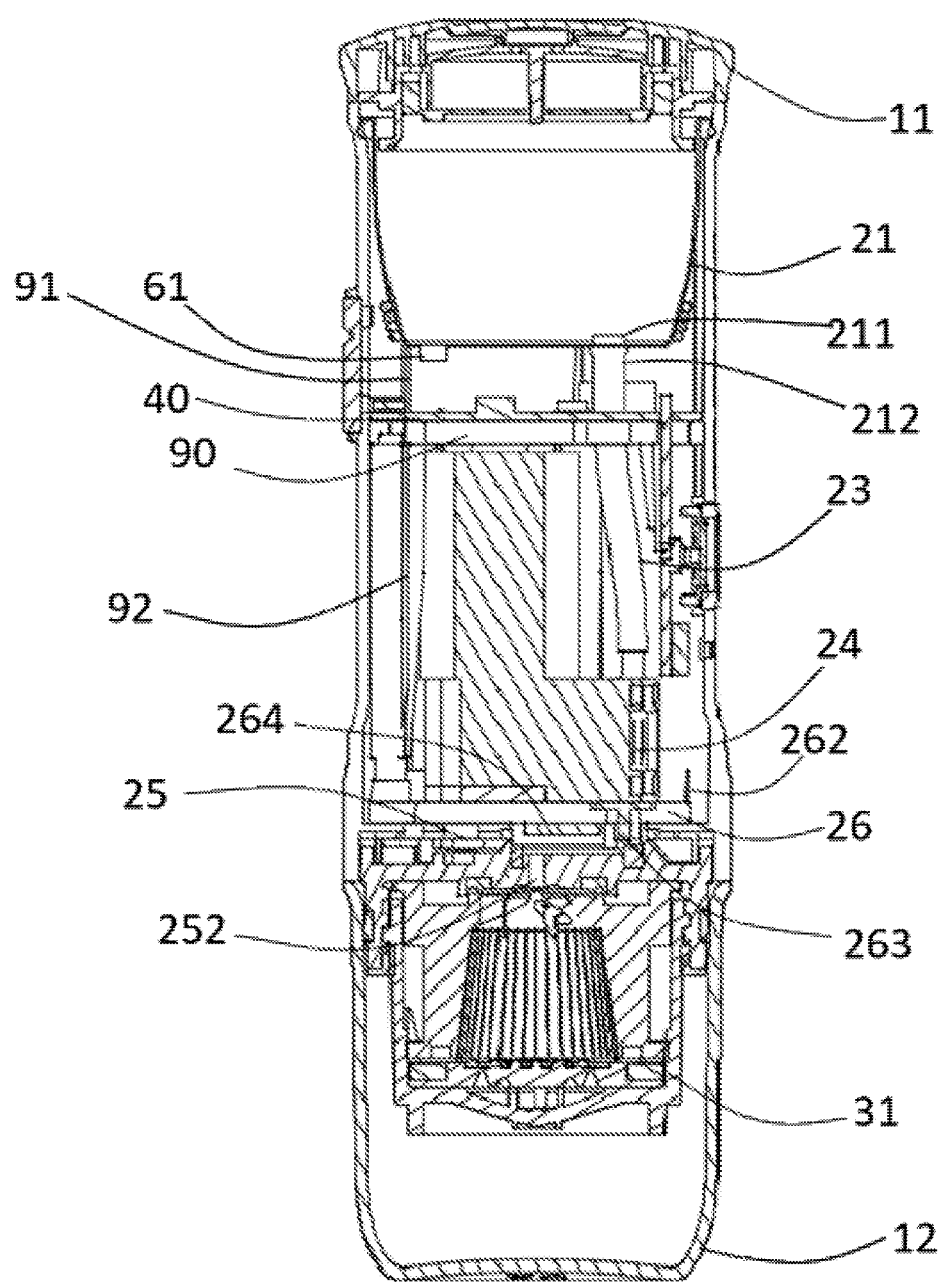
FIG. 1 is a schematic view of the structure of the present invention's portable electric pumping coffee machine.

To make the above objectives, features, and advantages of the present invention more apparent and understandable, a detailed description of specific embodiments of the present invention will be given below in conjunction with the accompanying drawings.

Example 1

Referring to FIGS. 1-11, a portable electric pumping coffee machine is provided. The coffee machine comprises a housing 10, a cup lid 11, a coffee cup 12, a mounting bracket 90, a power module 70, a drainage module 20, an extraction module 30, a controller 40, a drive module 50, and a sensor assembly 60. The controller 40 comprises a control module 41. The drainage module 20 comprises a water storing cup 21, a water pump 22, a conduit 23, a drainage assembly 24, a fixing base 25, and a limiting frame 26. The fixing base 25 is connected to the limiting frame 26, which comprises a fixing projection 262 for fixing the drainage assembly 24. The water storing cup 21 is used for receiving and storing hot water, and the water pump 22 is used to draw water from the drainage module 20 into the extraction module 30. The drainage assembly 24 is connected to the water pump 22 and the conduit 23 to change the direction of water flow. The extraction module 30 comprises a transferring cup 31, a first extraction container 32, and a second extraction container 33. The first extraction container 32 is used for placing coffee powder, and the second extraction container 33 is used for placing a coffee capsule. The transferring cup 31 can be detachably connected to the first extraction container 32 or the second extraction container 33. The control module 41 is used to receive signals from the sensor assembly 60 and send instructions to the drive module 50. The drive module 50 comprises a driving motor 51 for driving the water pump 22 in the drainage module 20. The power module 70 comprises a battery 72 for powering the drive module 50.

One side of the housing 10 is equipped with a button 101 and or more indicator lights 102. The side of the housing 10 far from button 101 has a charging interface slot, which corresponds to a charging interface on the controller 40. Threaded holes are located at the bottom edge of housing 10 and opening is located near the center at the bottom of housing 10. There is also a through slot extending from the center of the bottom of housing 10 towards the edge. The power module 70, the drainage module 20, the control module 41, the drive module 50, and the sensor assembly 60 are all installed inside housing 10. The mounting bracket 90 is connected to the water cup 21, and at the top of mounting bracket 90 is provided with the controller 40, the control module 41 is a circuit in the controller 40. A plurality of upper fixing arms 91 are located above the mounting bracket 90 to reserve space for the controller 40, while a plurality of lower fixing feet 92 are located below the mounting bracket 90 to engage with the limit frame 26. The sensor assembly 60 comprises a first sensor 61 and a second sensor 62.

Figure 9A:
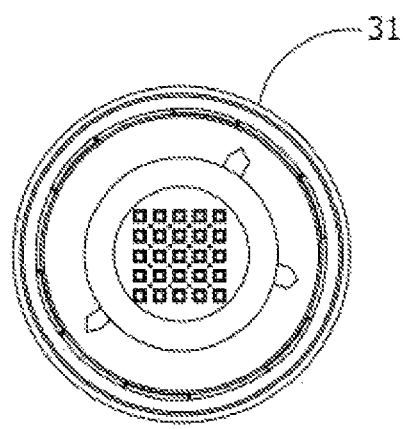
FIG. 9A and FIG. 9B are schematic views of an transferring cup of the portable electric pumping coffee machine of the present invention.
Figure 9B:
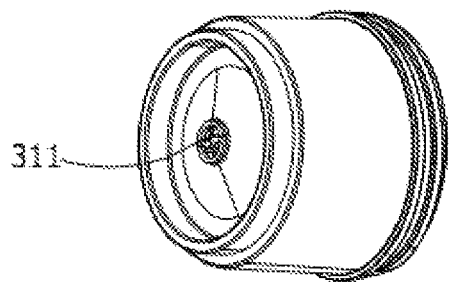
Figure 10:
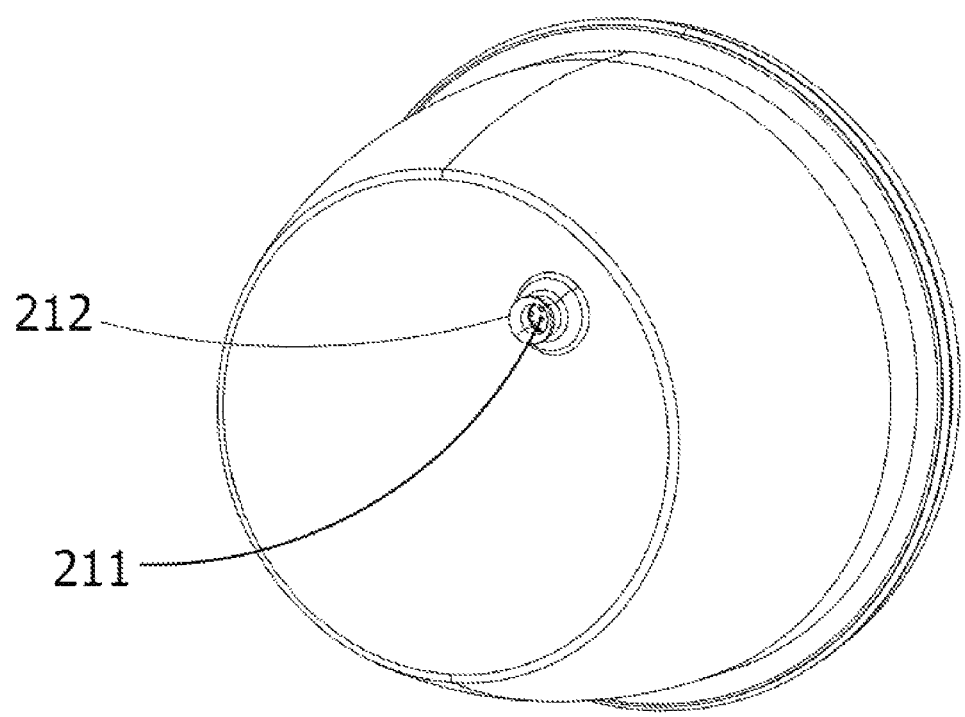
FIG. 10 is a schematic view of a water storing cup of the portable electric pumping coffee machine according to a first embodiment of the present invention.
Figure 11:
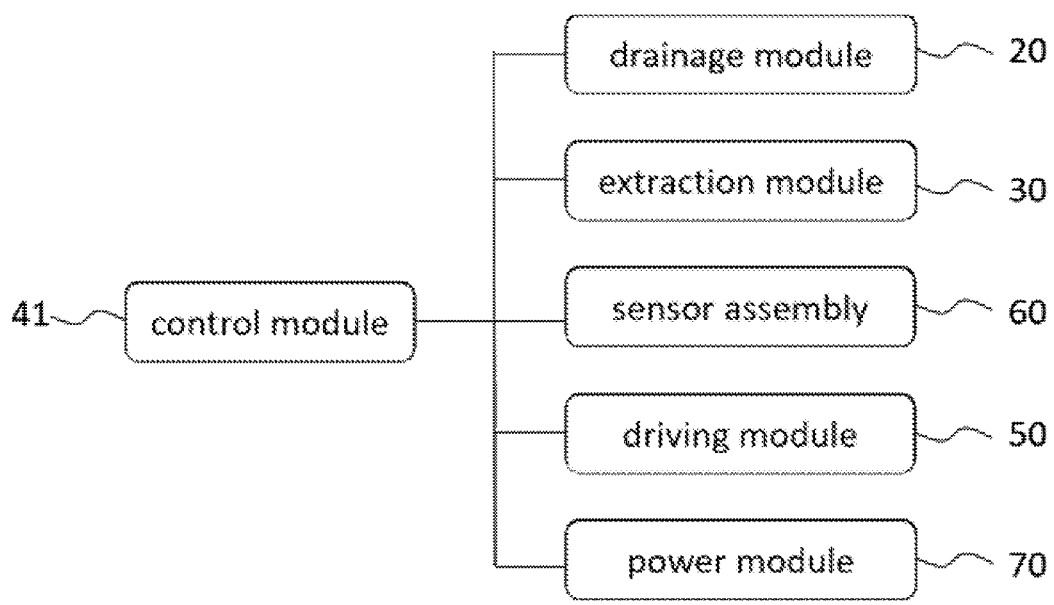
FIG. 11 is a modular composition diagram of the portable electric pumping coffee machine according to the first embodiment of the present invention.
Figure 12:
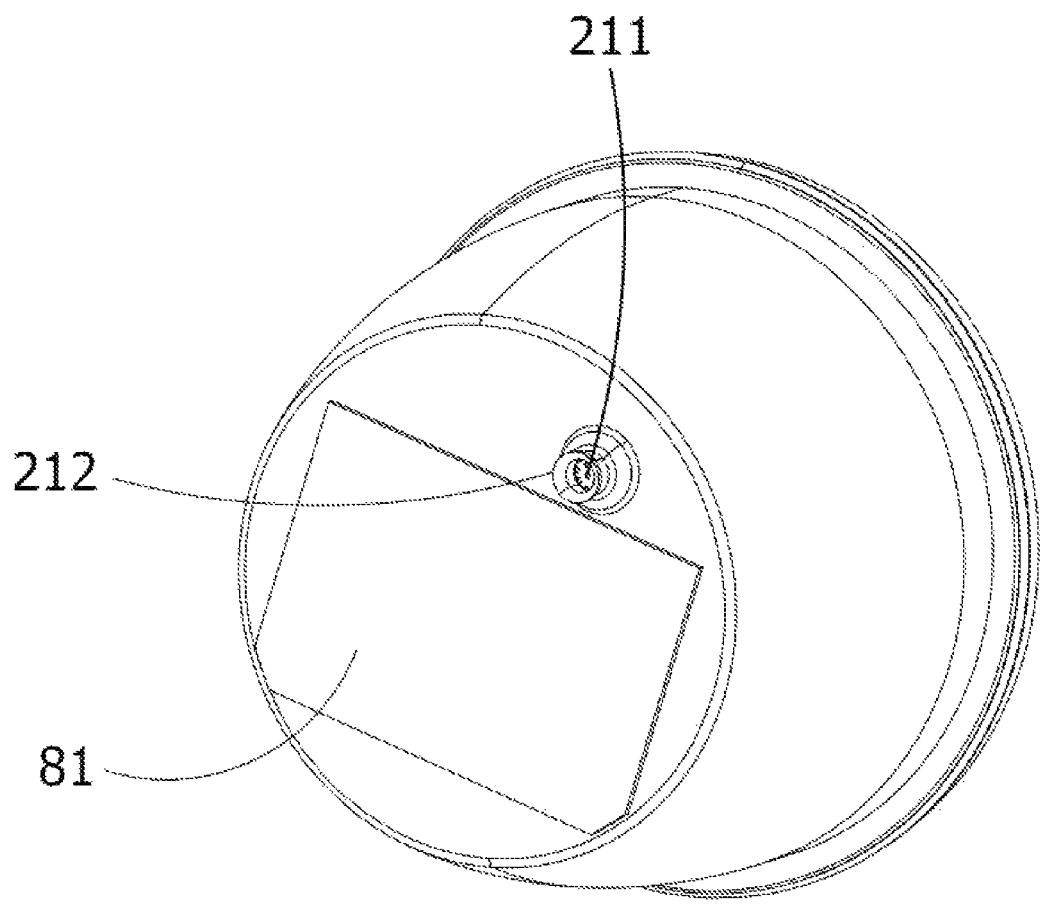
FIG. 12 is a schematic view of the water storing cup of the portable electric pumping coffee machine according to a second embodiment of the present invention.
Figure 13:
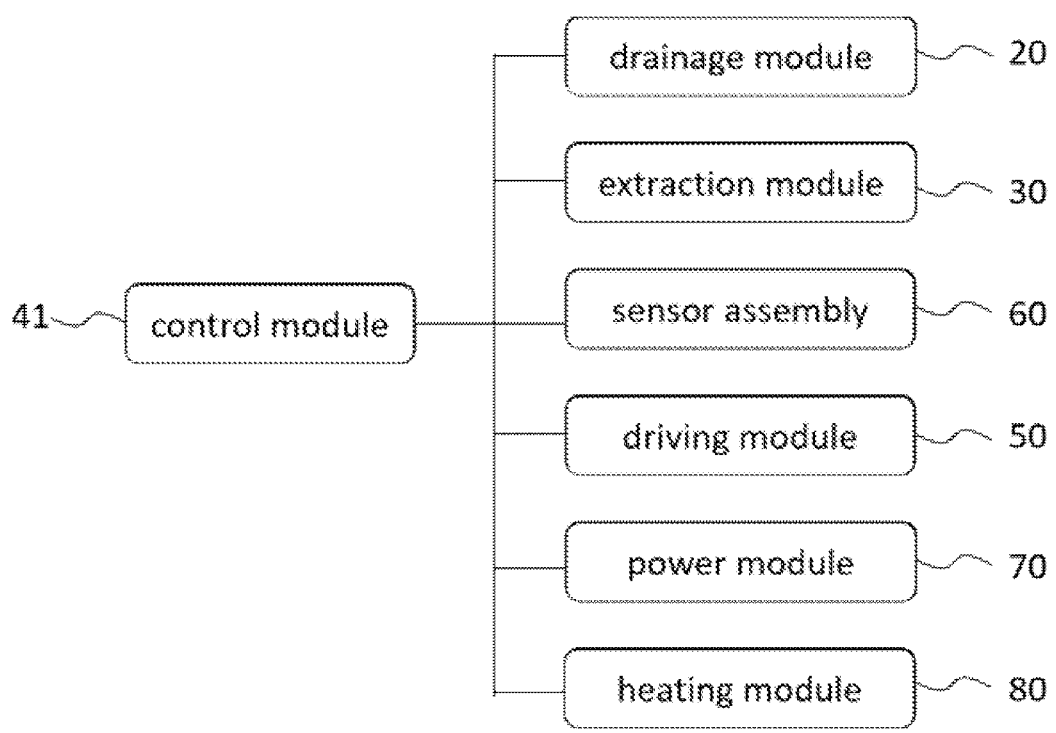
FIG. 13 is a schematic view of the modular composition of the portable electric pumping coffee machine according to the second embodiment of the present invention.
Figure 14:
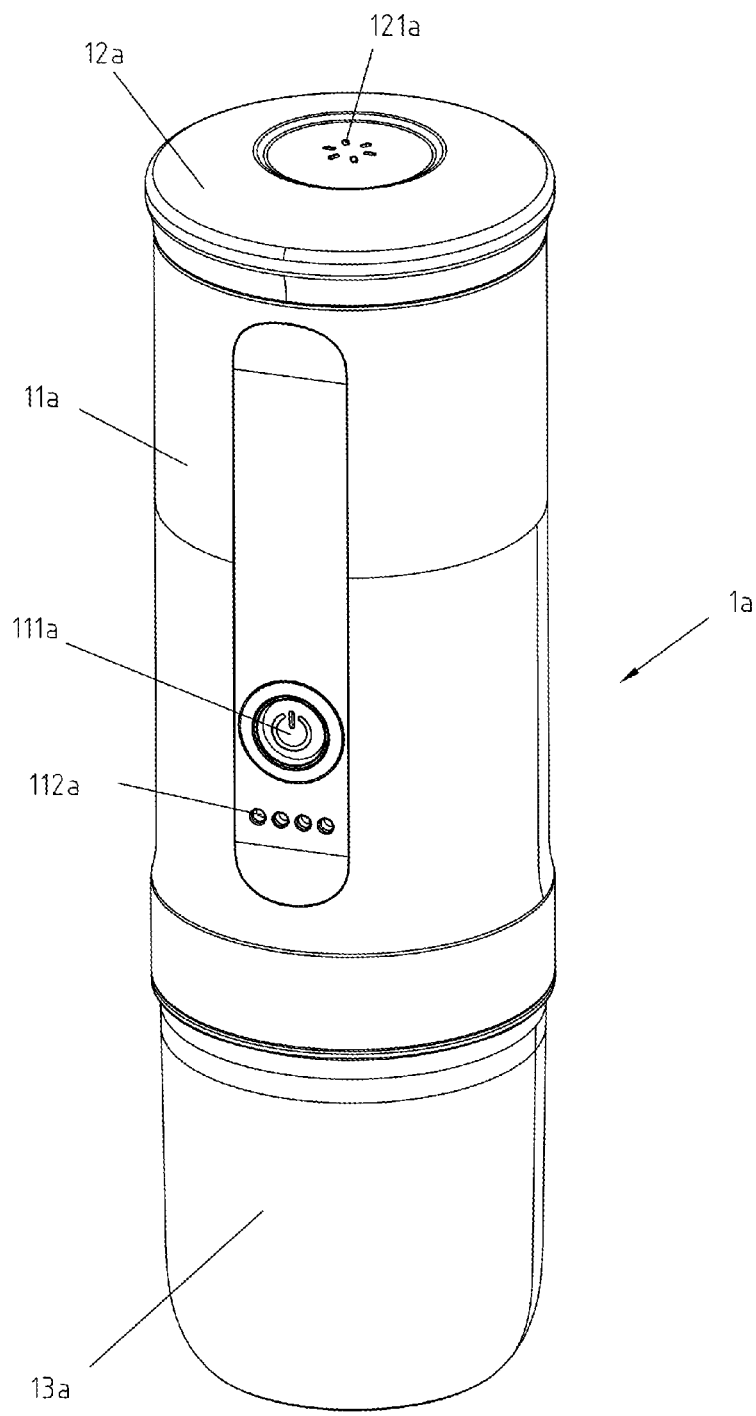
FIG. 14 is a perspective view of a portable coffee machine according to a third embodiment of the present invention.
Figure 15:
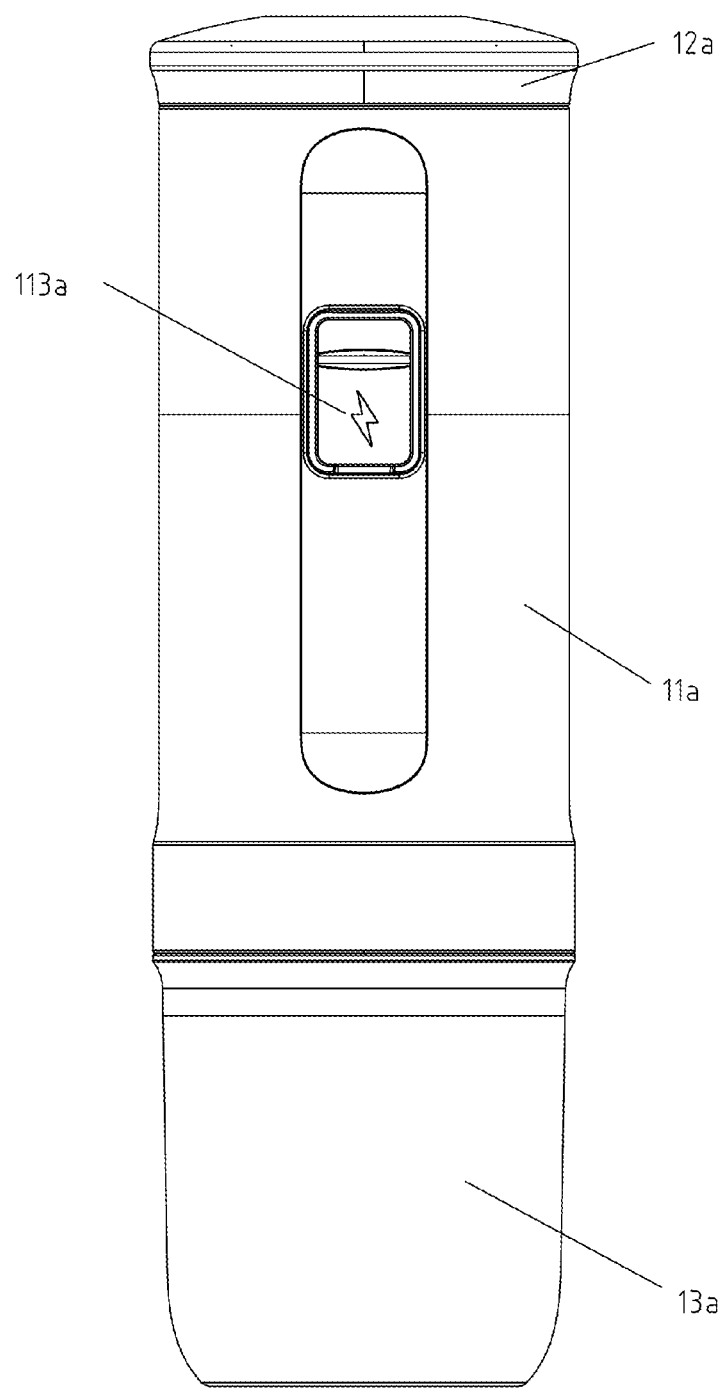
FIG. 15 is a schematic view of a back of the portable coffee machine according to the third embodiment of the present invention.
Figure 16:
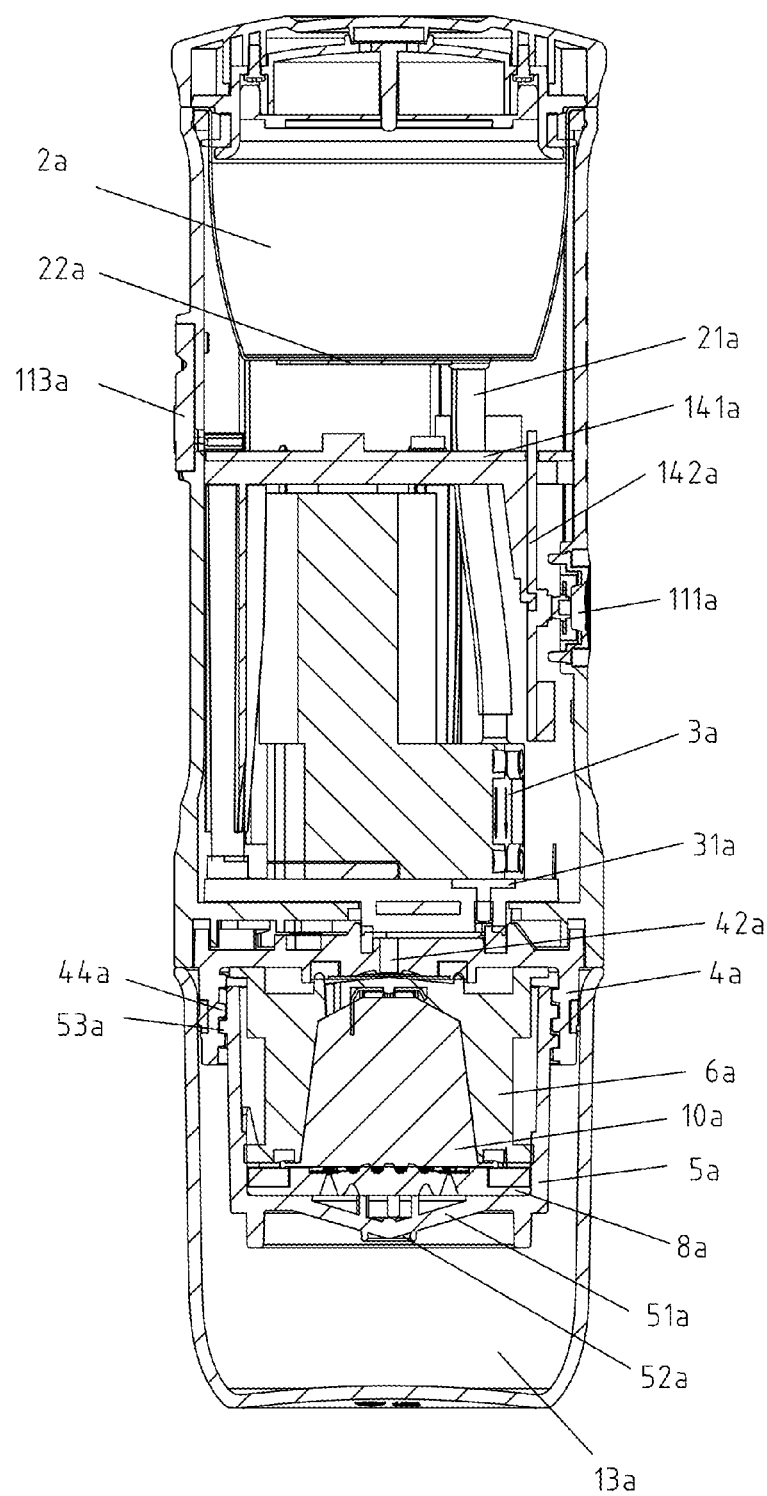
FIG. 16 is a sectional schematic view of the portable coffee machine according to the third embodiment of the present invention.
Figure 17:
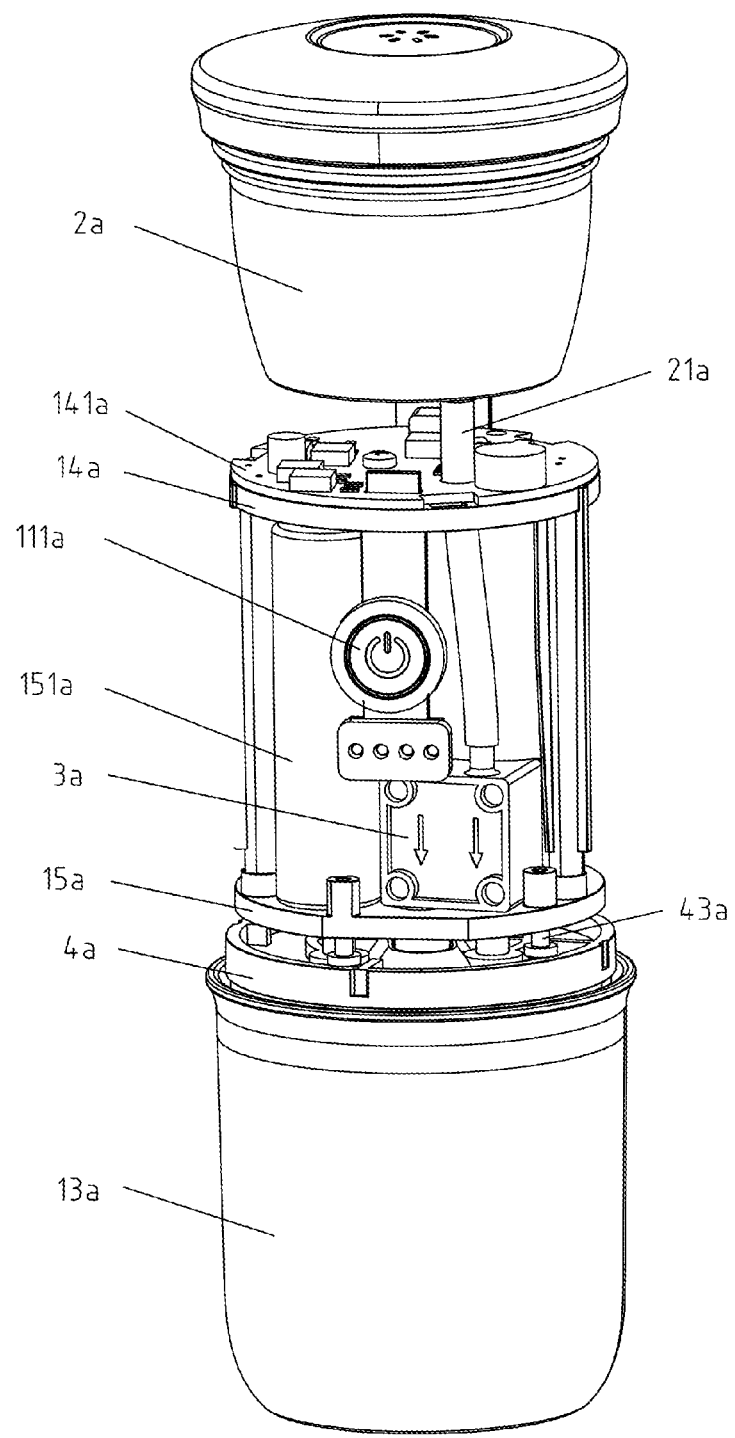
FIG. 17 is a schematic view of an internal structure of the housing of the portable coffee machine according to the third embodiment of the present invention.
Figure 18:
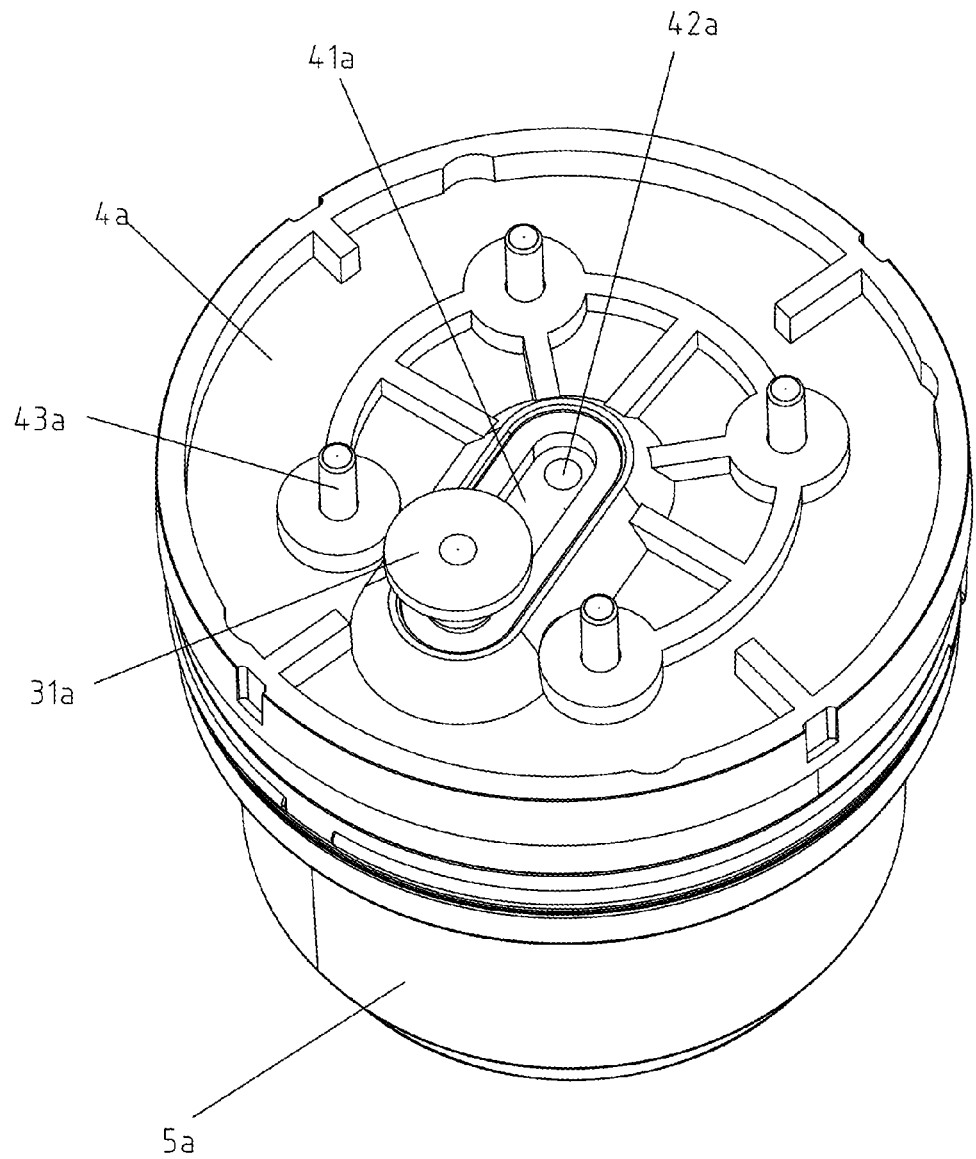
FIG. 18 is a schematic view of a drain sleeve of the portable coffee machine of according to the third embodiment of the present invention.
Figure 19:
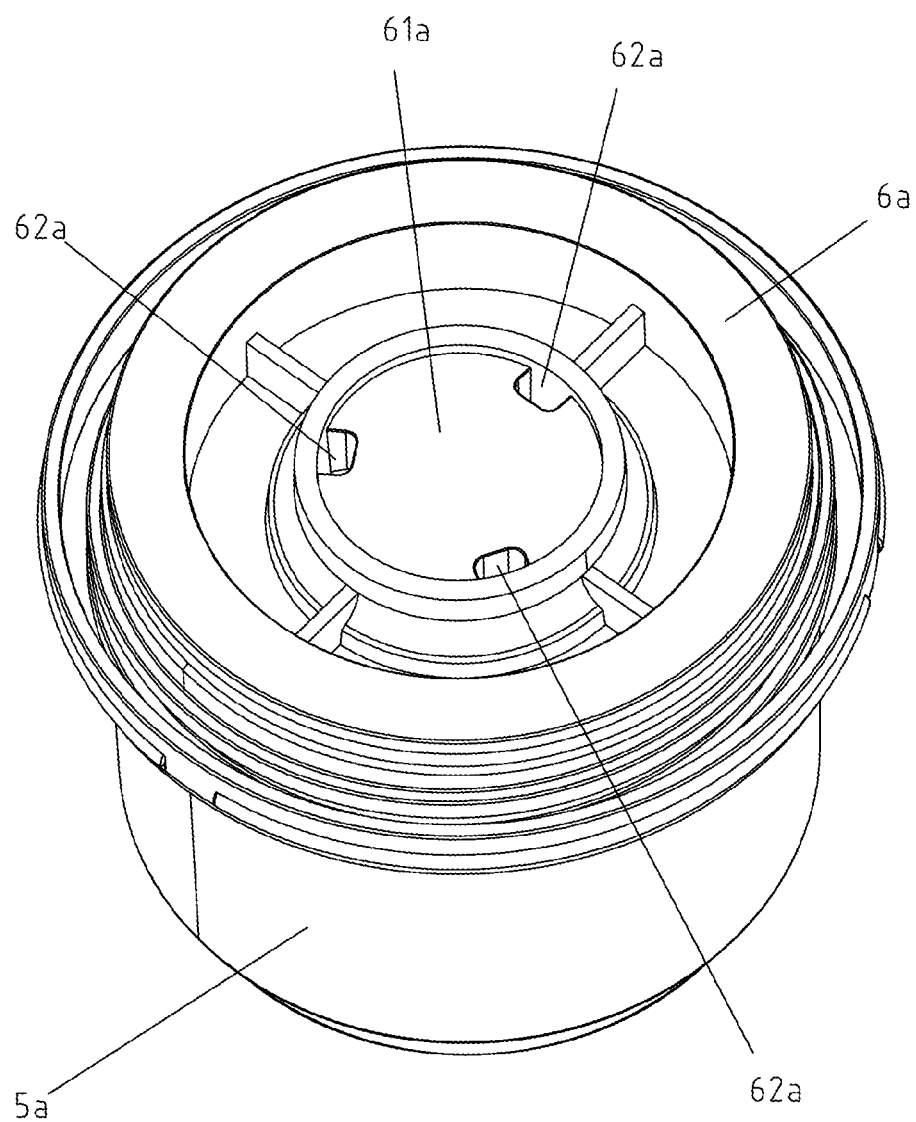
FIG. 19 is a schematic view of the structure of a diversion sleeve of the portable coffee machine according to the third embodiment of the present invention.
Figure 20:
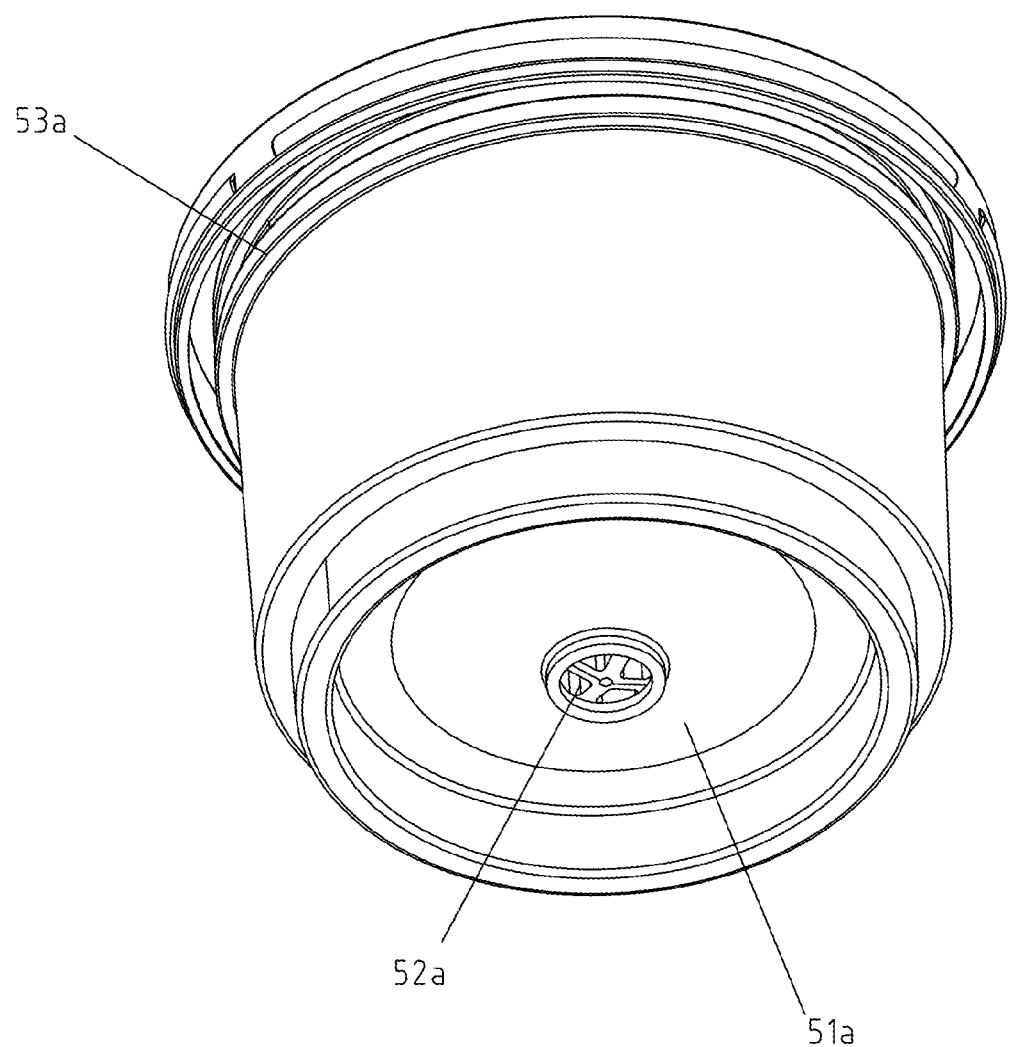
FIG. 20 is a top view of the supporting sleeve of the portable coffee machine according to the third embodiment of the present invention.
Figure 21:
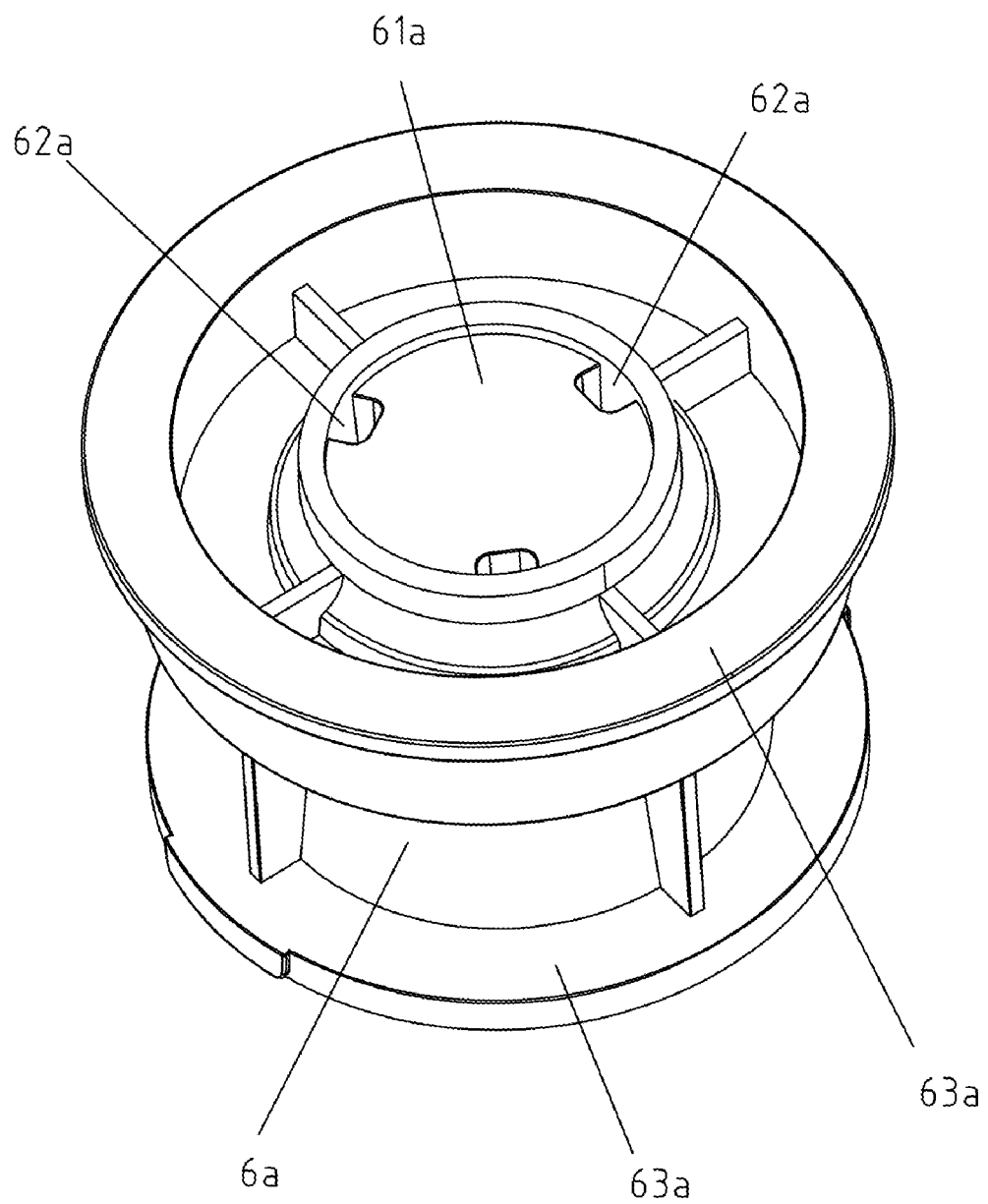
FIG. 21 is a perspective view of the diversion sleeve of the portable coffee machine according to the third embodiment of the present invention.
Figure 22:
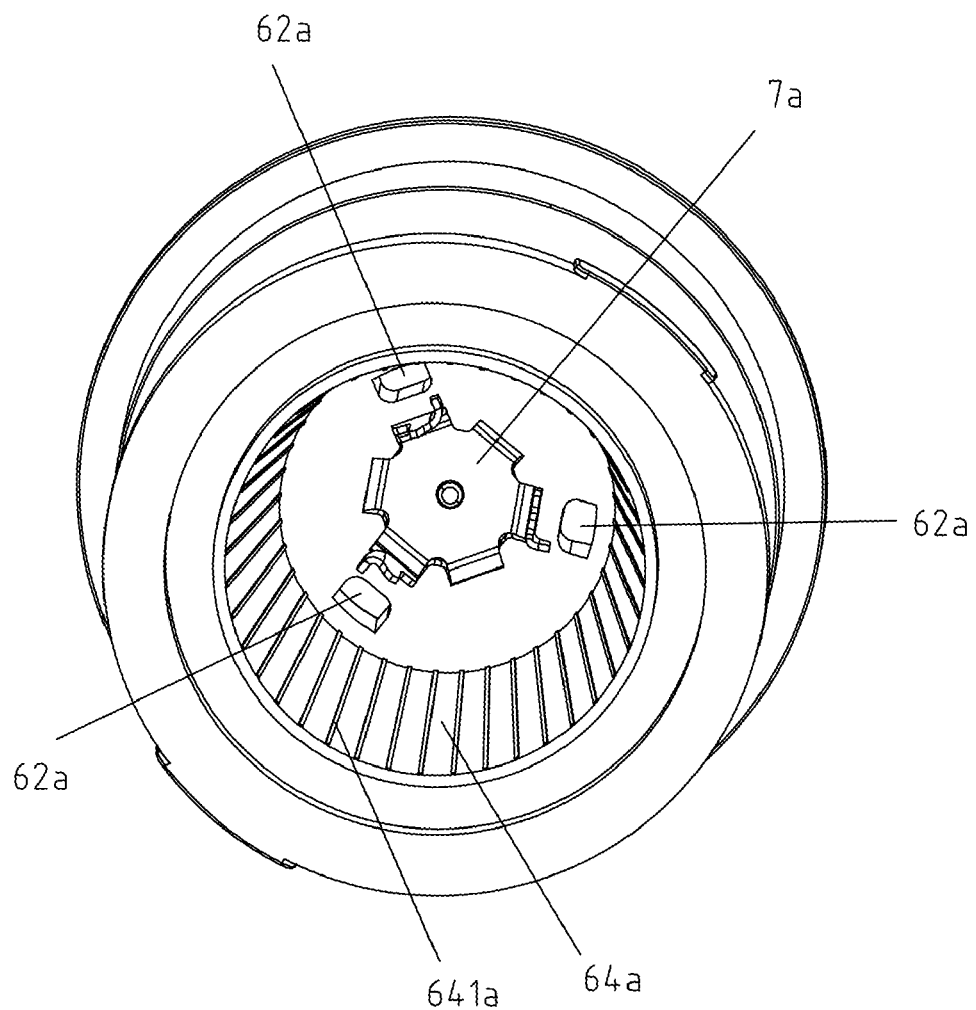
FIG. 22 is a top view of the diversion sleeve of the portable coffee machine according to the third embodiment of the present invention

As shown in FIG. 1, FIG. 9A and FIG. 9B, the cup lid 11 is connected to the water storing cup 21. A sealing ring is provided at the connection between the outer edge of the cup lid 11 and the water pump 22 to prevent water leakage. The top of the cup lid 11 is provided with an exhaust hole for venting water vapor. The central area of the bottom of the cup lid 11 is equipped with a soft pad which has a plastic protrusion at its center. Small gaps are formed at the interface between the soft pad and the plastic protrusion for water vapor discharge to avoid the influence of water vapor pressure on the cup lid 11 and the water storing cup 21. The water storing cup 21 is located at the top of the housing 10 and is connected to the upper fixed foot 91. Three clipping slots are provided at the bottom periphery of the water storing cup 21, and fixing claws are provided on the upper fixing arms 91. The water storing cup 21 is connected to the fixing claws of the upper fixing arms 91 by the clipping slots, and a sealing ring is provided at the outer edge of the water storing cup 21 to seal the connection between the water storing cup 21 and the housing 10. A peripheral hole 211 is provided at the bottom edge of the water storing cup 21, and the peripheral hole 211 is formed by a plurality of densely distributed small holes. A hollow column 212 is extended vertically outward below the peripheral hole 211 on the outer bottom of the water storing cup 21, and the hollow column 212 is connected to one end of the conduit 23, and the conduit 23 is wrapped on the outer surface of the hollow column 212. The conduit 23 can be a plastic hose. Due to the surface tension and atmospheric pressure of water, this structure can prevent water in the water storing cup 21 from flowing out of the conduit 23 when the water pump 22 is not working.

Figure 7:
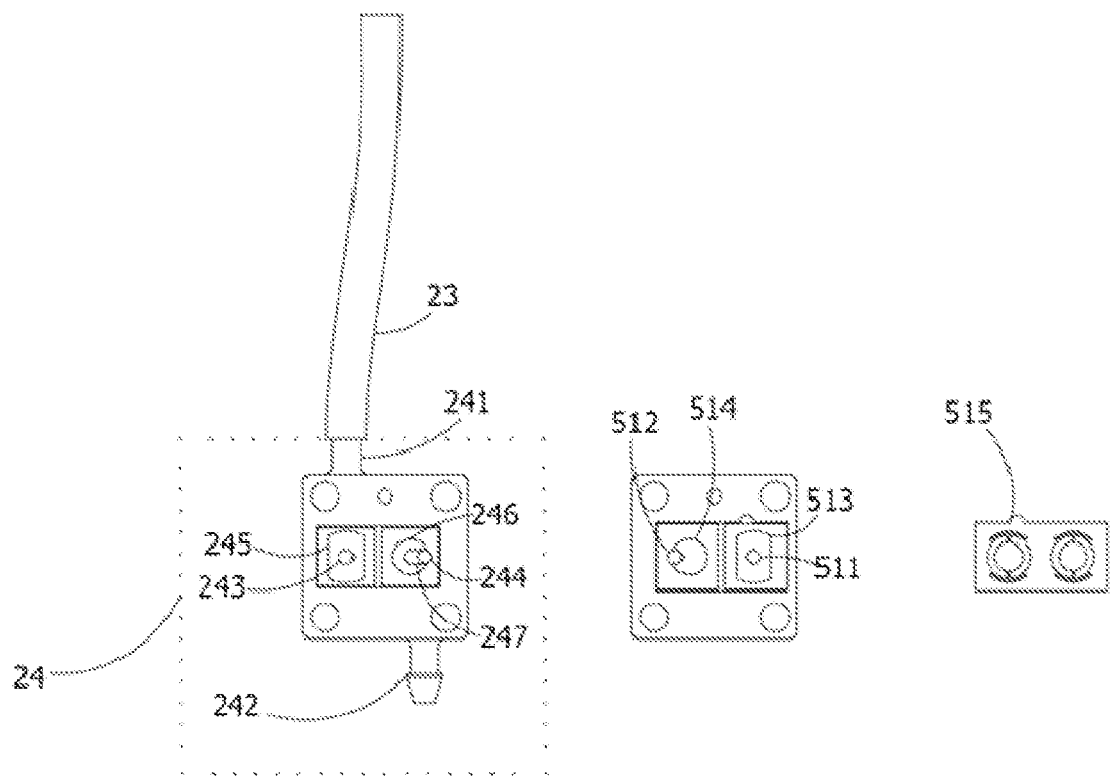
FIG. 7 is a schematic view of the joint of a drainage module and a water pump of the portable electric pumping coffee machine of the present invention.

As shown in FIG. 7, the drainage assembly 24 comprises an inlet end 241, an outlet end 242, a first inlet hole 244, and a first outlet hole 243. The inlet end 241 of the drainage assembly 24 is extended upwardly from the top thereof, and the outlet end 242 is extended downwardly from the bottom of the drainage assembly 24. The inlet end 241 is connected to one end of the conduit 23, and one end of the conduit 23 is wrapped around the outer surface of the inlet end 241. A first cavity is defined below the inlet end 241, and the first cavity is cylindrical in shape and extends downwardly to the first outlet hole 243. A second cavity is arranged below the first inlet hole 244, and the second cavity is cylindrical in shape and is extended downwardly to the outlet end 242. The outer surface of the drainage assembly 24 is provided with a first groove 245, a second groove 246, and a threaded hole. The second groove 246 is deeper than the first groove 245 and is arranged side by side with the first groove 245 to avoid excessive pressure on the drainage assembly or overflow of water due to high water flow rate. The first outlet hole 243 is provided in the first groove 245 which is hexagonal in shape, and is centered in the first groove 245. The first inlet hole 244 is provided in the second groove 246 which is circular in shape and is located on one side of the circular edge of the groove away from the center. A sloping groove 247 is also provided in the second groove 246 to facilitate water flow into the first inlet hole 244 and avoid water overflow.

On one side of the water pump 22, there is a threaded hole, a third groove 513 and a fourth groove 514, wherein the third groove 513 and the fourth groove 514 are arranged side by side. The third groove 513 is hexagonal, and the fourth groove 514 is circular. Compared to the third groove 513, the mouth of the fourth groove 514 is deeper and can avoid water overflow. The second water outlet hole 511 is provided in the third groove 513 at the center of the third groove 513, and the second water inlet hole 512 is provided in the fourth groove 514 on one side of the circumference away from the center of the circle.

In the drainage assembly 24, one side of the first groove 245 and the second groove 246 is coupled to one side of the third groove 513 and the fourth groove 514 in the water pump 22 by thread connection. The first groove 245 is connected to the fourth groove 514, and the second groove 246 is connected to the third groove 513. The first water outlet hole 243 corresponds to the center of the fourth groove 514, and the water flows into the center of the fourth groove 514 from the first water outlet hole 243 and then flows into the second water inlet hole 512. The water flows into the center of the second groove 246 from the second water outlet hole 511, and then flows along the inclined groove 247 into the first water inlet hole 244. A waterproof gasket 515 is provided between the joint surface of the drainage assembly 24 and the water pump 22 to prevent water from overflowing. The water flows into the water inlet end 241 through the conduit 23, flows out from the first water outlet hole 243 along the first cavity, flows into the second water inlet hole 512 and enters the water pump 22. After pressurization by the water pump 22, the water flows out from the second water outlet hole 511 and then flows into the first water inlet hole 244, and flows out from the outlet end 242 along the second cavity. At this time, the position of the water flow is laterally offset.

As shown in FIG. 1, the limiting frame 26 is connected to the drainage assembly 24. The first through hole 263 is provided at the edge of the upper surface of the limiting frame 26, and the outlet end 242 extends into the first through hole 263. The limiting frame 26 is provided with a raised threaded hole on the upper surface, and the bottom of the housing 10 is provided with a threaded hole. The limiting frame 26 is connected to the bottom of the housing 10 through a thread. The limiting frame 26 is provided with a short protrusion 262 for limiting the drainage assembly 24. A raised block 264 extends from the first through hole 263 on the lower surface of the limiting frame 26 toward the center of the limiting frame 26, and a threaded hole is provided on the lower surface of the limiting frame 26.

Figure 5:
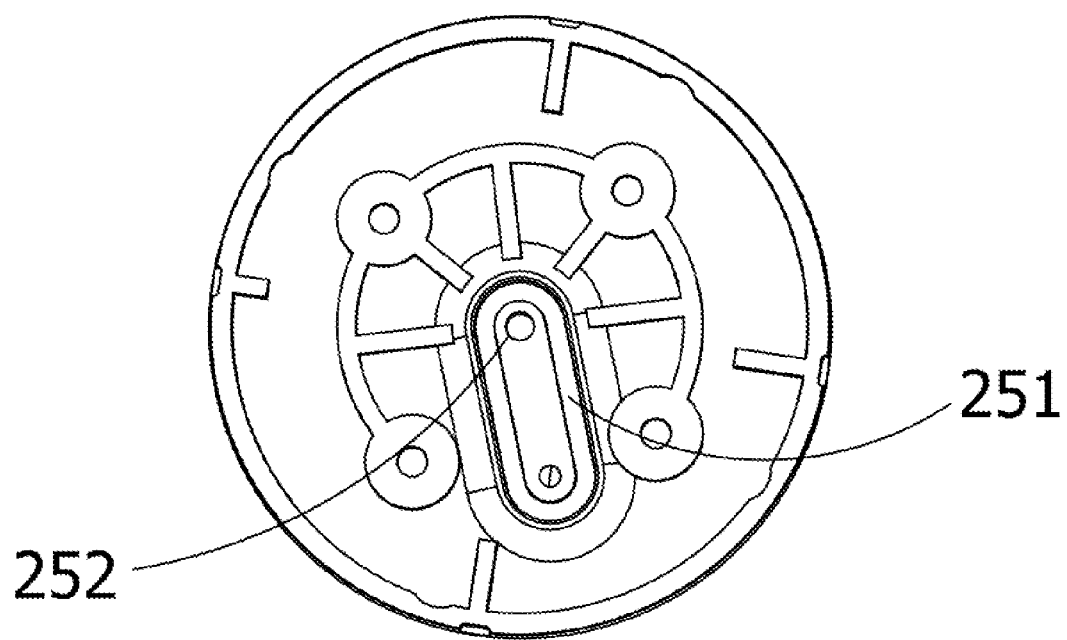
FIG. 5 is a schematic view of the fixing base of the portable electric pumping coffee machine of the present invention.

As shown in FIG. 5, the fixing base 25 is located below the bottom of the housing 10, and a connector block is provided on the fixing base 25, while a connector slot is provided at the bottom of the housing 10, wherein the fixing base 25 is clipped and connected to the housing 10, and a sealing gasket is provided in the central area of the fixing base 25. The bottom of the fixing base 25 is provided with a threaded hole, which corresponds to an opening at the bottom of the housing 10. The limiting frame 26 above the bottom of the housing 10 is connected to the fixing base 25 through a threaded connection through an opening at the bottom of the housing 10. Beneath the protruding block 264 of the limiting frame 26, the fixing base 25 is arranged to align with the fifth groove 251, and the edge of the protruding block 264 passes through the penetrating groove at the bottom of the housing 10 and is fitted to the edge of the fifth groove 251. The center position of the fixing base 25 in the fifth groove 251 is provided with a second through hole 252. Water flows into the fifth groove 251 from the first through hole 263 at the water outlet 242, and then flows out of the fifth groove 251 through the second through hole 252. A sealing ring is provided around the edge of the fifth groove 251 to prevent the leakage of water.

Figure 8A:
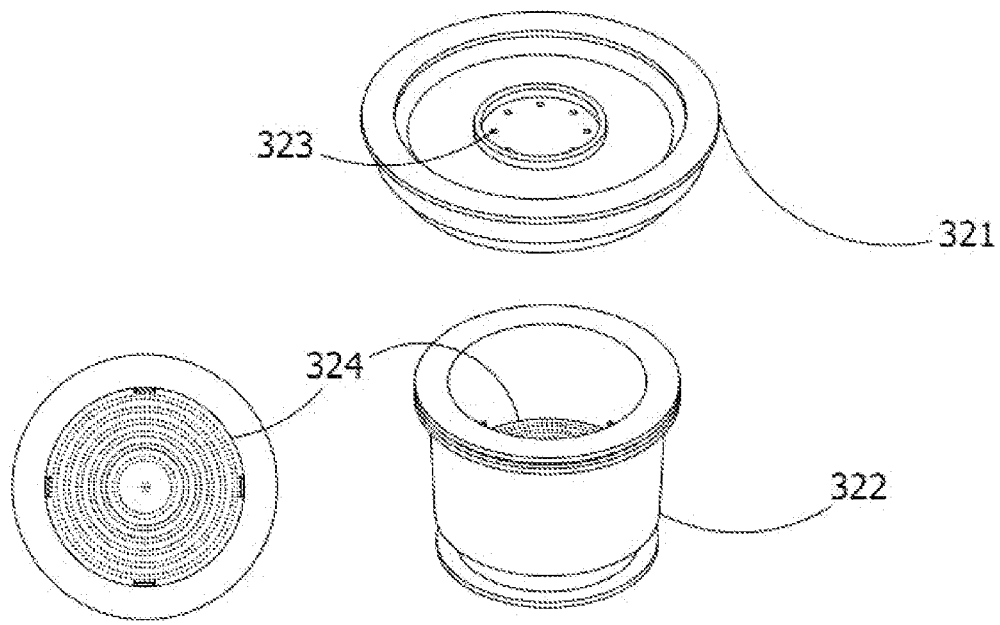
FIG. 8A and FIG. 8B are schematic views of the structure of a first extraction container of the portable electric pumping coffee machine of the present invention.
Figure 8B:
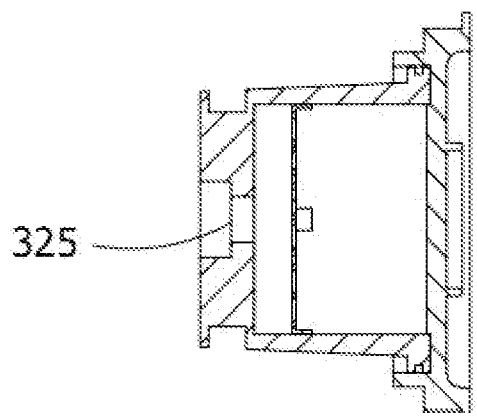

As shown in FIG. 8A and FIG. 8B, the first extraction container 32 comprises a cover body 321 and a container body 322 for extracting coffee powder. The top of the cover body 321 is provided with a third through hole 323 arranged in a ring shape, which can allow the water to flow in and form a circulation to fully extract the coffee powder. The bottom of the container body 322 is provided with a filtering layer 324 made of metal material, and the edge of the filtering layer 324 is provided with a plurality of upward extending buckles for convenient disassembly and cleaning. A one-way valve 325 is provided at the center of the outer bottom of the container body 322 to prevent the reflux of coffee liquid caused by high pressure after the water pump 22 stops running. After the water flows out from the second through hole 252, it flows into the third through hole 323 on the top of the cover body 321, and then enters the container body 322 through the third through hole 323. When the water pump 22 starts in operation, a pressure difference is formed near the water pump 22 due to the centrifugal force, and the water flow is sucked into the guide tube 23 and enters the drainage assembly 24. The pressurized water flow can open the one-way valve 325, and after passing through the filtering layer 324, the water flow flows out from the one-way valve 325. The filtering layer 324 contains a plurality of densely arranged small holes in a ring shape, which can form a circulation when the coffee liquid passes through, further increasing the pressure and facilitating the water flow to open the one-way valve 325.

Figure 6:
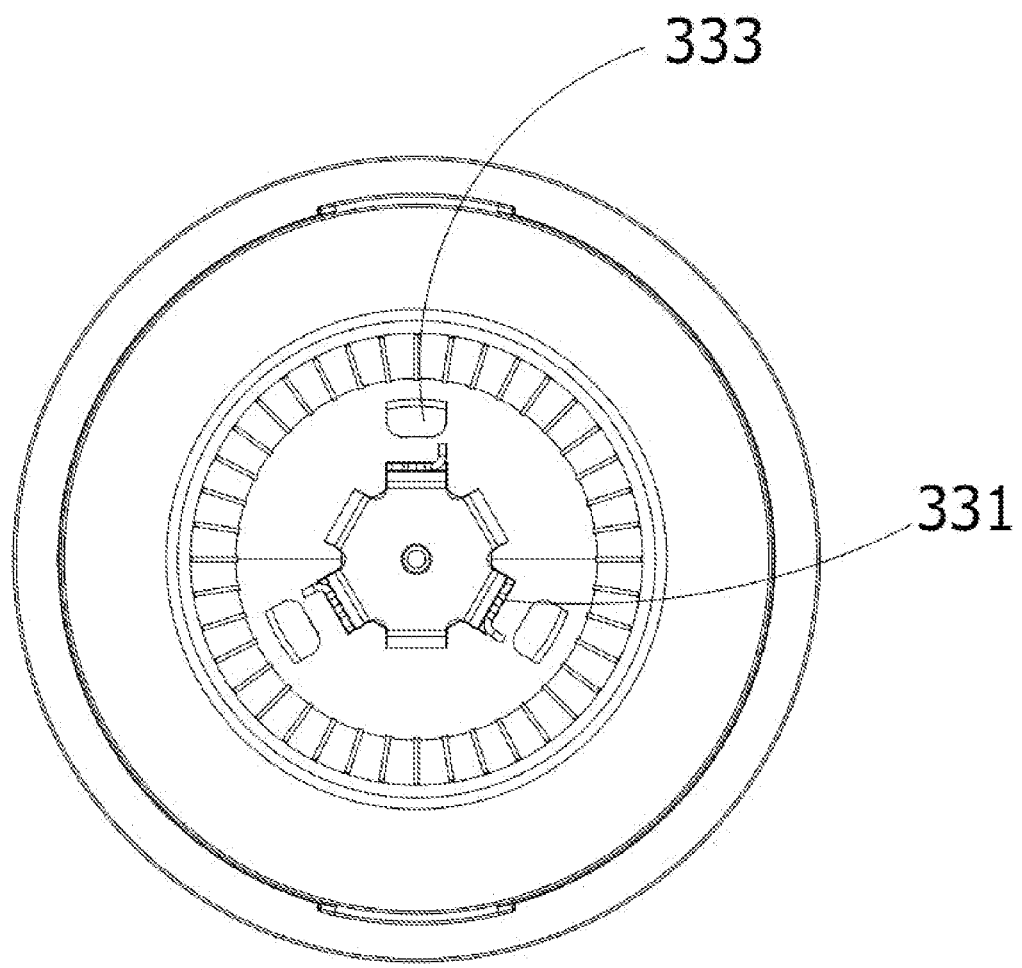
FIG. 6 is a schematic view of the structure of a second extraction container of the invention's portable electric pumping coffee machine.

As shown in FIG. 6, there is a hexagonal groove in the center of the bottom of the second extraction container 33, and there are a plurality of extraction blades 331 extending upward at the edge of the hexagonal groove. The outer wall of the second extraction container 33 is equipped with a fitting slot, and the inner wall of the second extraction container 33 is equipped with threads. The coffee capsule can rotate into the second extraction container 33, which is convenient for the extraction blades 331 to puncture the bottom of the coffee capsule. There is a fourth through hole 333 near the edge of the bottom of the second extraction container 33 where it is close to the extraction blade 331. Each extraction blade 331 is arranged at a position corresponding to a fourth through hole 333, and water flows in from the fourth through holes 333 so as to flow into the coffee capsule and extract the coffee in the coffee capsule. The extraction blades 331 are bent towards the direction of the fourth through holes 333 at the side, so that the water flow from the fourth through hole 333 fully flows into the coffee capsule along the extraction blades 331.

As shown in FIG. 9A and FIG. 9B, there is a plurality of protrusions arranged in a square array on the bottom center circular area of the transferring cup 31. The protrusions on the bottom of the transferring cup 31 can reserve the space required for the film expansion, make the film easier to be punctured, and adapt to the shape of the film on top of some models of coffee capsules. There are small holes between the protrusions, located in the center of the adjacent four protrusions. a plurality of clipping blocks is provided near the bottom of the inner wall of the transferring cup 31. A first extraction container 32 can be placed inside the transferring cup 31. The first extraction container 32 is filled with coffee powder. After extraction, the extracted coffee flows out through the small holes at the bottom of the transferring cup 31 and gathers along the inclined grooves to the transferring cup outlet 311, then flows out of the transferring cup 31. A second extraction container 33 can also be placed inside the transferring cup 31. The second extraction container 33 is filled with the coffee capsule. The clipping slots of the second extraction container 33 can be matched with the clipping blocks of the transferring cup 31 to limit the rotation of the second extraction container 33 in the transferring cup 31. During the extraction process, water flows into the coffee capsule and can flow along the extraction blades 331 to extract the coffee. When the internal pressure of the coffee capsule reaches a threshold, the coffee liquid punctures the film on top of the coffee capsule and flows out of the transferring cup 31 through the small holes. Then it flows into the coffee cup 12, which is connected to the fixing base 25, and the transferring cup 31 is provided in the coffee cup 12.

Figure 2:
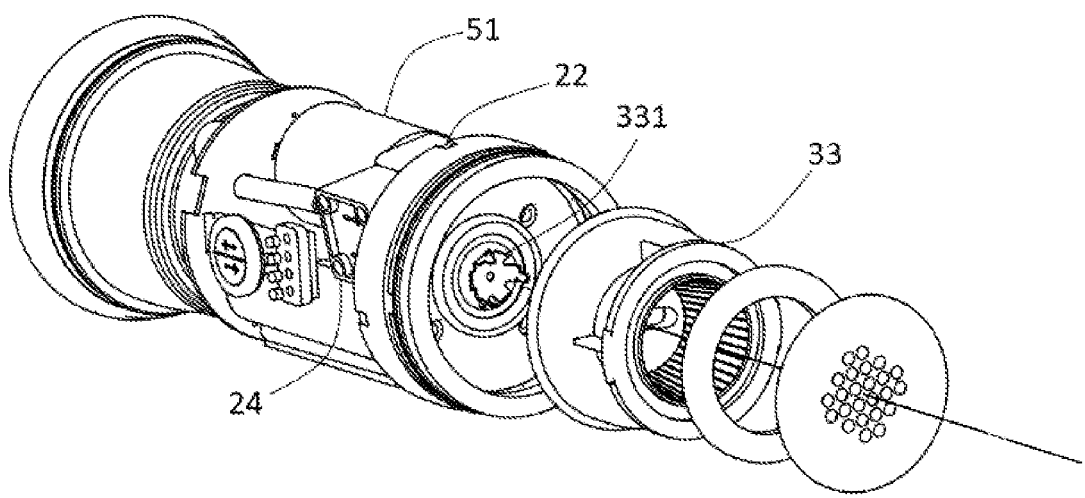
FIG. 2 is an exploded view of the portable electric pumping coffee machine of the present invention.
Figure 3:
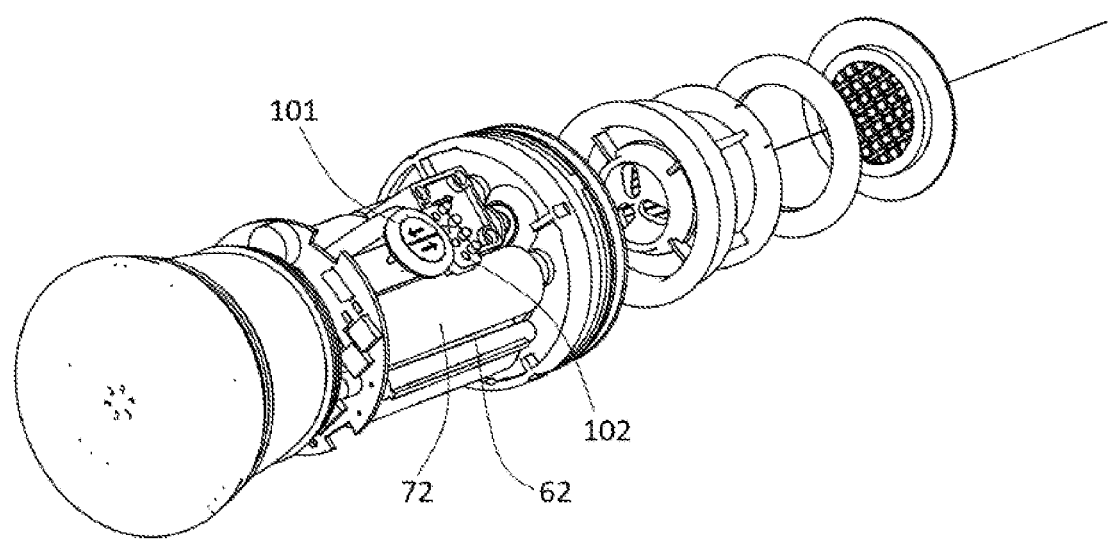
FIG. 3 is another exploded view of the portable electric pumping coffee machine according to the present invention.
Figure 4:
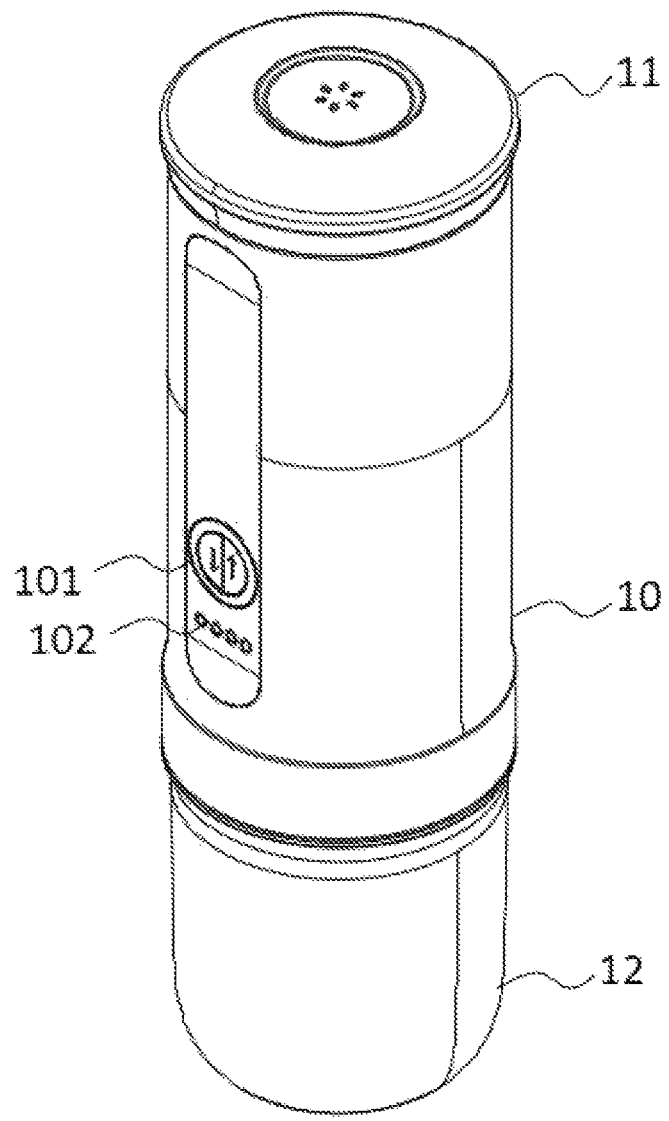
FIG. 4 is a side view of the portable electric pumping coffee machine of the present invention.

As shown in FIGS. 2-3, the first sensor 61 is located at the bottom of the water storing cup 21, and the second sensor 62 is located on the battery 72. The first sensor 61 and the second sensor 62 can be temperature sensors. The first sensor 61 is used to measure the water temperature in the water storing cup 21, and the second temperature sensor 62 is used to measure the temperature of the battery 72. When the first sensor 61 detects that the water temperature in the water storing cup 21 is 20° C.-40° C., it sends a sensing signal to the control module 41. The control module 41 sends an instruction to the indicator light 102, and one indicator light 102 lights up. When the first sensor 61 detects that the water temperature in the water storing cup 21 is 41° C.-60° C., it sends a sensing signal to the control module 41. The control module 41 sends an instruction to the indicator light 102, and two indicator lights 102 light up. When the first sensor 61 detects that the water temperature in the water storing cup 21 is 61° C.-80° C., it sends a sensing signal to the control module 41. The control module 41 sends an instruction to the indicator light 102, and three indicator lights 102 light up. When the first sensor 61 detects that the water temperature in the water storing cup 21 is 81° C.-96° C., it sends a sensing signal to the control module 41. The control module 41 sends an instruction to the indicator light 102, and four indicator lights 102 light up. When the second sensor 62 detects that the temperature of the battery 72 is greater than the preset value, it sends a sensing signal to the control module 41. The control module 41 sends an instruction to the buzzer on the controller 40 to make the buzzer beep, and at the same time, the control module 41 cuts off the power to avoid the battery 72 from overheating, where the controller can be used.

After the button 101 is continuously pressed for to seconds, the water pump 22 runs. When the water pump 22 runs, the water in the storage cup 21 flows into the drainage assembly 24 along the conduit 23, flows out of the drainage assembly 24 after being pressurized by the water pump 22, and flows into the first extraction container 32 or the second extraction container 33 for extraction after passing through the limiting frame 26 and the fixing base 25, and then flows into the liquid cup 12 through the transferring cup 31. To can be 1-3 seconds.

When the first sensor 61 detects that the water temperature within the storage cup 21 exceeds the preset value $T_1$, it sends a sensing signal to the control module 41. The control module 41 sends instructions to the buzzer, which beeps to indicate that hot water is inside the storage cup 21. At the same time, the control module 41 sends instructions to drive the water pump 22 through the driving motor 51. $T_1$ can 70° C.-100° C., or 80° C.-96° C.

Example 2

Referring to FIGS. 1-9 and FIGS. 12-13, the difference from the first Embodiment is that the portable coffee machine further comprises a heating module 80. The heating module 80 comprises a heating member 81 which is a heating plate, which may be a ceramic heating plate or a silicone heating plate. The heating member 81 is located at the bottom of the water storing cup 21. When the button 101 on the housing 10 is continuously pressed for a duration $t_1$ of several seconds, the control module 41 sends an instruction to the buzzer, and the buzzer emits a beep. At the same time, the control module 41 sends an instruction to the heating module 80 to heat and boil the water in the water storing cup 21 by the heating member 81. When the first sensor 61 detects that the temperature is higher than the provided value T1, it sends a sensing signal to the control module 41. The control module 41 sends an instruction to the buzzer to beep, indicating that the water in the water storing cup 21 has been heated. The control module 41 then sends an instruction to the heating module 80 to stop working and an instruction to the driving motor 51 to drive the water pump 22. $T_1$ can 70° C.-100° C., or 80° C.-96° C., the duration $t_1$ may be 2-5 seconds, or otherwise as desired.

Example 3

As shown in FIGS. 14 to 17, the present invention discloses a heating assembly in the third embodiment which is applied in a portable coffee machine, the heating assembly comprises a heating cup 2a. The heating cup 2a is connected with a water pipe 21a. The heating element is arranged on the outer surrounding wall or the bottom of the heating cup 2a to heat and boil the water in the heating cup 2a. The water pipe 21a is arranged on the outer side of the bottom of the heating cup 2a. The heating element is a heating member 22a which is installed at the bottom of the heating cup 2a.

In this solution, the outlet of the heating cup 2a is located on a peripheral edge thereof, and the water pipe 21a of the heating cup 2a is connected to the edge of the heating cup 2a. This provides an installation area for the heating member 22a at the bottom of the heating cup, avoiding the water pipe 21a from passing through the heating member which is a heating plate. It can ensure the heating efficiency, avoid damage to the water pipe 21a, and reduce production costs.

The present invention discloses another solution for a heating component in one of its alternative embodiment, wherein the heating member is positioned at the bottom of the heating cup 2a, and the water pipe 21a is located at the center of the bottom of the heating cup 2a, and passes through the heating device.

Another embodiment of the present invention discloses a another heating solution, in which the heating device is a heating tube that is wound around the outer wall and bottom of the heating cup 2a. Space is left in the heating tube for the water pipe 21a to pass through.

Another alternative mode of the present invention discloses a heating member 22a which comprises a surrounding covering wall covered on the outer wall and the bottom of the heating cup 2a. Additionally, a hole is provided at a bottom of the heating member 22a for the water pipe 21a to pass through when the heating member 22a is extended to the bottom of the heating cup 2a. Alternatively, the heating member 22a may be only attached to the outer surrounding wall of the heating cup 2a.

As shown in FIGS. 14 to 22, the present invention discloses a portable coffee machine comprising the a machine main body 1a, wherein the machine main body 1a employs the heating assembly as disclosed.

The machine main body 1a, from top to bottom, comprises a top cover 12a, a housing 11a and a coffee cup 13a. The heating cup is located between the housing 11a and the top cover 12a. The brewing mechanism is located at the bottom of the housing 11a and between the coffee cup 13a.

The housing 11a is provided with an upper supporting plate 14a and a lower supporting plate 15a. The water pump 3a is installed on the lower supporting plate 15a, and the drain sleeve 4a is installed below it. The water pump 3a is connected to the heating cup 2a through the water pipe 21a.

The brewing mechanism comprises a water pump 3a, a drain sleeve 4a, a supporting sleeve 5a, and a diversion sleeve 6a. The drain sleeve 4a is threaded to connect with the supporting sleeve 5a. The diversion sleeve 6a is provided between the supporting sleeve 5a and the drain sleeve 4a. The coffee capsule 10a is installed inside the diversion sleeve 6a. The coffee cup 13a is then placed at the drain sleeve 4a and can be sealed with either a snap-fit or threaded connection.

During the brewing process, the water pump 3a draws water from the heating cup and pressurizes it to pass through drain sleeve 4a and diversion sleeve 6a, and the water acts on the coffee capsule 10a to achieve brewing, then the coffee liquid passes through the coffee outlet hole 52a of the supporting sleeve 5a and finally flows into the coffee cup 13a.

An electric battery 151a is placed in the space between the lower supporting plate 15a and the upper supporting plate 14a to provide power supply to this device.

On the upper supporting plate 14a, there is a control circuit board 141a installed, which is connected to a vertical sub-board 142a. The sub-board 142a has a control button 111a and an indicator light 112a below it. The housing 11a also has a charging port 113A, which is connected to the circuit board 141a installed on the upper supporting plate.

At the heating cup 2a, there is also a temperature sensor connected to the circuit board 141a for detecting if the water in heating cup 2a is hot water. After it is determined that it is not hot water, the heating member 22a will begin to work, and when it is determined that the water in the heating cup 2a is hot water, the water pump will be automatically driven to pump the hot water into the coffee capsule 10a.

In addition, to ensure pressure balance and avoid the problem of water not being discharged, there is a breath hole 121a at the top of the top cover 12a of this device, and a one-way valve is installed at the breath hole 121a to prevent water leakage from the heating cup. When the water pump 3a works to suck the water from the heating cup 2a into the drain sleeve 4a and the diversion sleeve 6a, the air pressure inside the heating cup 2a decreases, and air enters through the breath hole 121a to maintain pressure equilibrium.

Because the settings of the water pipe 21a and the heating member 22a are diversified, the device is equipped with the drain sleeve 4a, which is used to correctly guide the hot water to the diversion sleeve 6a. A collection groove 41a is provided on the top surface of the drain sleeve 4a, and a collection hole 42a is arranged at the center. The water pump 3a is provided with an outlet 31a, which is aligned with the collection groove 41a below the outlet 31a.

The drain sleeve 4a is provided with several connecting pins 43a, and is fixedly installed at the lower supporting plate 15a through the connecting pins 43a.

The purpose of the diversion sleeve 6a in this device is to evenly disperse the collected hot water, so as to fully act on the coffee powder in the coffee capsule and achieve the purpose of uniform mixing. Therefore, a diversion groove 61a is provided in the middle of the top surface of the diversion sleeve 6a, and a diversion hole 62a is provided on the outer side of the diversion groove 61a. The capsule compartment 64a is installed inside the diversion sleeve 6a, and one or more breaking blades 7a are installed on the top of the capsule compartment 64a. The breaking blade 7a is used to cut open the outer wall of the coffee capsule 10a, so that the water flowing down from the diversion hole 62a can fully mix with the coffee powder.

The diversion sleeve 6a is equipped with flanges 63a on both sides, and can be firmly retained between the supporting sleeve 5a and the drain sleeve 4a by the flanges 63a.

The inner wall of the capsule compartment 64a is provided with several protrusion strips 641a, which provide sufficient friction to prevent the coffee capsule 10a from slipping and provide guidance for the water flow.

The supporting sleeve 5a is equipped with a guide cone surface 51a at the bottom, and a coffee outlet hole 52a is provided at the convergence of the guide cone surface 51a. The bottom plate 8a is placed inside the supporting sleeve 5a, with several protrusions on the bottom plate 8a to hold the coffee capsule 10a, and several spikes are also provided on the bottom plate 8a.

The supporting sleeve 5a is provided with an external thread 53a, and the drain sleeve 4a is provided with an internal threaded portion 44a, and they are connected and installed through the threads.

The above description is only the disclosure of the preferred embodiment of the present invention, and the implementation and scope of the present invention should not be limited thereto. Those skilled in the art should be able to realize that any equivalent substitution and obvious modification made based on the disclosure and illustrations of the present invention are within the scope of the present invention.

What is claimed is:

1. A portable electric pumping coffee machine, comprising:
   a drainage module which comprises a water storing cup and a water pump;
   a heating module;
   an extraction module comprising an extraction container and a transferring cup which is detachably connected to said extraction container;
   a controller, wherein said controller controls said heating module to boil water in said water storing cup and drives said water pump to pump water in said water storing cup into said extraction container; and
   a first sensor which detects water temperature within said water storing cup for instructing said controller to control operation of said heating module;
   wherein said portable electric pumping coffee machine further comprises a driving module, a power module and a second sensor, wherein said power module comprises a battery, wherein said second sensor is connected to said battery to detect a temperature of said battery, wherein said driving module is electrically connected to said control module, and said driving module comprises a driving motor, wherein said driving motor is connected to said water pump for driving said water pump, wherein said power module is electrically connected to said control module and said driving module.

2. A portable electric pumping coffee machine, comprising:
   a drainage module which comprises a water storing cup and a water pump;
   a heating module;
   an extraction module comprising an extraction container and a transferring cup which is detachably connected to said extraction container;
   a controller, wherein said controller controls said heating module to boil water in said water storing cup and drives said water pump to pump water in said water storing cup into said extraction container; and
   a first sensor which detects water temperature within said water storing cup for instructing said controller to control operation of said heating module;
   wherein said water storing cup has a peripheral hole communicated to said water pump, wherein said heating module comprises a heating member which is located at a bottom of said water storing cup at an inner side of said peripheral hole;
   wherein said portable electric pumping coffee machine further comprises a driving module, a power module and a second sensor, wherein said power module comprises a battery, wherein said second sensor is connected to said battery to detect a temperature of said battery, wherein said driving module is electrically connected to said control module, and said driving module comprises a driving motor, wherein said driving motor is connected to said water pump for driving said water pump, wherein said power module is electrically connected to said control module and said driving module.

3. A portable electric pumping coffee machine, comprising:
   a drainage module which comprises a water storing cup and a water pump;
   a heating module;
   an extraction module comprising an extraction container and a transferring cup which is detachably connected to said extraction container; and
   a controller, wherein said controller controls said heating module to boil water in said water storing cup and drives said water pump to pump water in said water storing cup into said extraction container;
   wherein said water storing cup has a peripheral hole communicated to said water pump, wherein said heating module comprises a heating member which is located at a bottom of said water storing cup at an inner side of said peripheral hole;
   wherein said extraction container is a second extraction container which is used for extracting coffee from a coffee capsule and is equipped with at least one extraction blade;
   wherein said second extraction container has a fourth through hole located close to said extraction blade, wherein said extraction blade is bent towards a direction of said fourth through hole.

* * * * *